United States Patent
Obata et al.

(10) Patent No.: US 12,388,096 B2
(45) Date of Patent: Aug. 12, 2025

(54) FUEL CELL SYSTEM AND CONTROL METHOD FOR FUEL CELL SYSTEM

(71) Applicant: NISSAN MOTOR CO., LTD., Yokohama (JP)

(72) Inventors: Takeaki Obata, Kanagawa (JP); Hayato Chikugo, Kanagawa (JP); Kazuhide Shimada, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 379 days.

(21) Appl. No.: 17/925,422

(22) PCT Filed: May 22, 2020

(86) PCT No.: PCT/IB2020/000505
§ 371 (c)(1),
(2) Date: Nov. 15, 2022

(87) PCT Pub. No.: WO2021/234426
PCT Pub. Date: Nov. 25, 2021

(65) Prior Publication Data
US 2023/0197983 A1 Jun. 22, 2023

(51) Int. Cl.
*H01M 8/04* (2016.01)
*H01M 8/04014* (2016.01)
*H01M 8/0432* (2016.01)
*H01M 8/04746* (2016.01)
*H01M 8/0612* (2016.01)

(52) U.S. Cl.
CPC ..... *H01M 8/04014* (2013.01); *H01M 8/0435* (2013.01); *H01M 8/04753* (2013.01); *H01M 8/0618* (2013.01)

(58) Field of Classification Search
CPC ......... H01M 8/04014; H01M 8/04302; H01M 8/04619; H01M 8/04955
See application file for complete search history.

(56) References Cited

U.S. PATENT DOCUMENTS 9,502,728 B1 * 11/2016 Farooque ............ H01M 8/0612
2018/0248210 A1 * 8/2018 Yaguchi ............ H01M 8/04992
2019/0393525 A1 12/2019 Diethelm et al.

FOREIGN PATENT DOCUMENTS

JP 2017-117550 A 6/2017

* cited by examiner

Primary Examiner — Olatunji A Godo
(74) Attorney, Agent, or Firm — Foley & Lardner LLP (57) ABSTRACT

The fuel cell system includes a fuel cell including a cell stack configured to have a reforming catalyst for generating hydrogen from hydrocarbon, a first flow path configured to supply a fuel containing hydrocarbon to the cell stack, and a second flow path configured to supply an oxidant gas to the cell stack such that the oxidant gas flows oppositely or orthogonally to the fuel. The control method for the fuel cell system including: detecting a temperature of a discharged oxidant gas that is the oxidant gas discharged from the second flow path; and performing a temperature control of the fuel cell based on the temperature of the discharged oxidant gas.

6 Claims, 7 Drawing Sheets

FUEL CELL SYSTEM AND CONTROL METHOD FOR FUEL CELL SYSTEM

TECHNICAL FIELD

The present invention relates to a fuel cell system and a control method for the fuel cell system, which includes a fuel cell.

BACKGROUND ART

JP 2017-117550 A discloses a method of controlling a temperature distribution throughout a fuel cell to be uniform by detecting a temperature of a central portion of a cell stack where the temperature is highest. In the fuel cell system, the temperature distribution throughout the fuel cell is made uniform by supplying an inert gas to the central portion of the cell stack where the temperature is highest, in order to decrease the temperature of the central portion of the cell stack.

SUMMARY OF INVENTION

As described above, JP 2017-117550 A is based on a premise that the central portion of the cell stack has the highest temperature, but depending on a configuration and/or an operation scene of the fuel cell, the central portion of the cell stack may not always have the highest temperature as compared with other portions. For example, in a fuel cell including a catalyst configured to reform a fuel (hereinafter, referred to as a reforming catalyst) inside a cell stack, when partial oxidation reforming is performed, an inlet end of the anode is relatively hotter than the central portion of the cell stack. Therefore, in the internal reforming fuel cell, when a temperature control is performed based on a temperature of the central portion of the cell stack, a temperature may exceed an upper limit of heat resistance in a part of the cell stack.

An object of the present invention is to provide a fuel cell system and a control method configured to perform a temperature control within a range not exceeding an upper limit of heat resistance in a fuel cell when a cell stack with a reforming catalyst is included.

One aspect of the present invention is a control method for a fuel cell system. The fuel cell system includes a fuel cell including a cell stack configured to have a reforming catalyst for generating hydrogen from hydrocarbon, a first flow path configured to supply a fuel containing hydrocarbon to the cell stack, and a second flow path configured to supply an oxidant gas to the cell stack such that the oxidant gas flows oppositely or orthogonally to the fuel. The control method for the fuel cell system including: detecting a temperature of a discharged oxidant gas that is the oxidant gas discharged from the second flow path; and performing a temperature control of the fuel cell based on the temperature of the discharged oxidant gas.

DESCRIPTION OF EMBODIMENTS

First Embodiment

Figure 1:
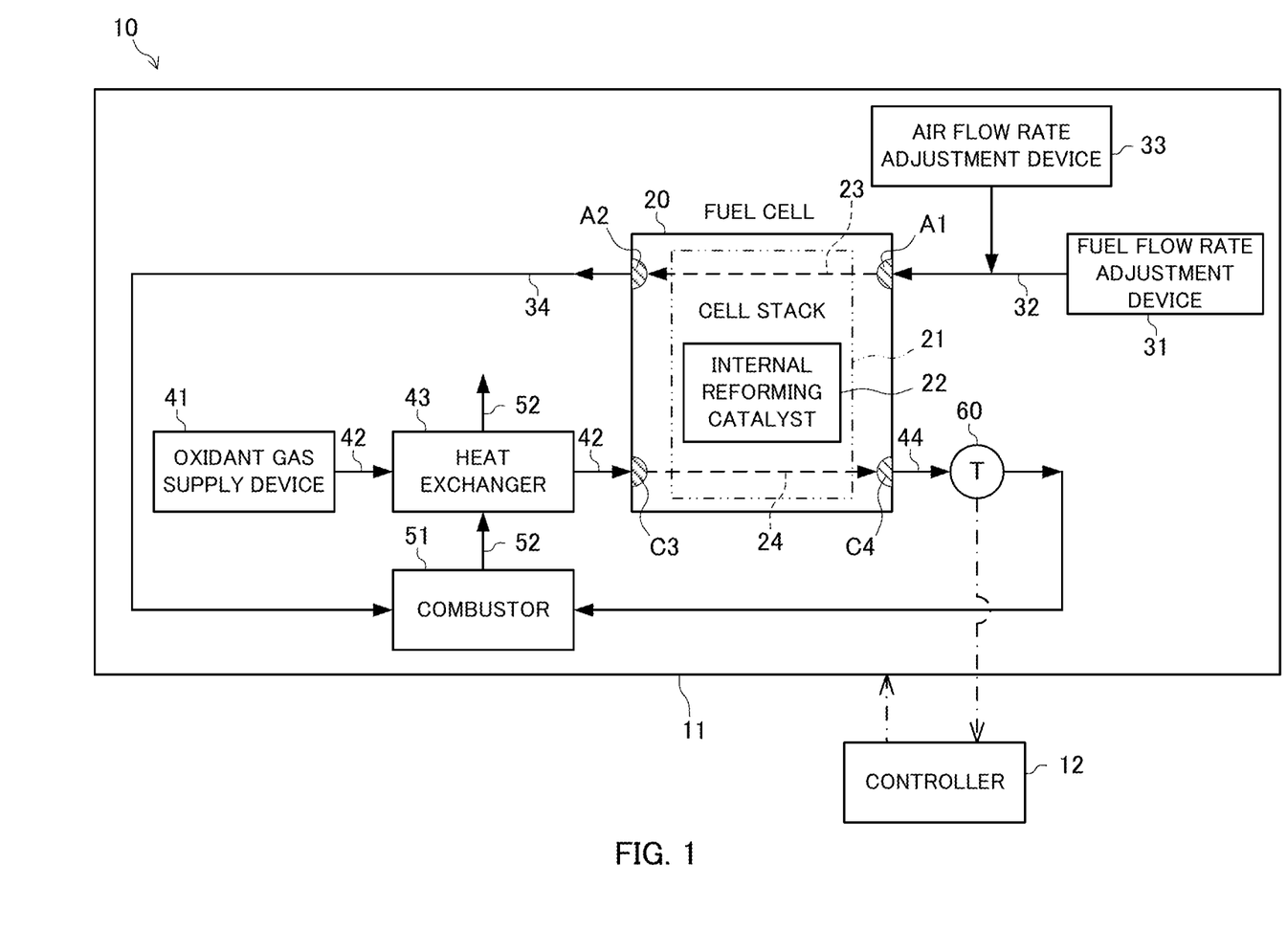
FIG. 1 is a block diagram showing a configuration of a fuel cell system according to a first embodiment.

FIG. 1 is a block diagram showing a configuration of a fuel cell system 10 according to a first embodiment. As shown in FIG. 1, the fuel cell system 10 includes a power generation device 11 and a controller 12. The power generation device 11 is a device that generates a power using a fuel cell 20, and includes, in addition to the fuel cell 20, a fuel flow rate adjustment device 31, an air flow rate adjustment device 33, an oxidant gas supply device 41, a heat exchanger 43, a combustor 51, a temperature sensor 60, and the like. The controller 12 is a control device that integrally controls the power generation device 11 and units constituting the power generation device 11.

The fuel cell 20 includes a fuel cell (hereinafter, simply referred to as a cell) configured to generate a power by an electrochemical reaction using a fuel and an oxidant gas. In the present embodiment, the fuel cell 20 includes a cell stack 21 which is formed by a single cell or by stacked multiple cells and configured to generate a required power as a whole.

The cell stack 21 includes a reforming catalyst inside thereof (hereinafter, referred to as an internal reforming catalyst). The internal reforming catalyst 22 reforms a fuel supplied to the fuel cell 20 (hereinafter, referred to as a raw fuel) by generating or promoting a specific chemical reaction, and generates a fuel (hereinafter, referred to as a reformed fuel (an anode gas)) that can be directly used for power generation from the raw fuel. The raw fuel is, for example, a fuel containing hydrocarbon group, such as an alkyl group, as its main component, and is specifically a hydrocarbon such as methane or an alcohol such as methanol. The internal reforming catalyst 22 generates the reformed fuel containing hydrogen used for the power generation from the raw fuel containing hydrocarbons. Therefore, the fuel cell 20 is a so-called direct internal reforming type, and in principle, the fuel cell 20 can generate a power by itself by supplying an unreformed raw fuel or an incompletely reformed raw fuel without requiring a separate reformer.

Fuel reforming that can be performed by the cell stack 21 includes, for example, partial oxidation reforming (PDX), steam reforming (SR), and carbon dioxide reforming. The internal reforming catalyst 22 contributes to a part or all of these reforming reactions.

Partial oxidation reforming is a reforming reaction in which the raw fuel is partially oxidized by mixing oxygen ($O_2$) with the raw fuel in order to obtain the reformed fuel. For example, when the raw fuel is methane ($CH_4$), partial oxidation reforming proceeds mainly by partial oxidation reaction shown in the following (1). In partial oxidation reforming, for example, complete combustion (complete oxidation) shown in the following (2) occurs and proceeds in an initial stage, except for a case where partial oxidation reforming is occurred on some very exceptional catalysts. Therefore, in partial oxidation reforming, water ($H_2O$) is also generated in addition to hydrogen ($H_2$). Both partial oxidation reaction of (1) and complete combustion of (2) are exothermic reactions. Therefore, partial oxidation reforming is an exothermic reaction. As can be seen from (1) and (2), partial oxidation reforming is a reaction that consumes oxygen. Therefore, partial oxidation reforming does not occur uniformly throughout the cell stack 21, but occurs relatively more in an upstream portion of a fuel flow path (a first flow path 23 to be described later) and relatively less in a downstream portion of the fuel flow path where oxygen has been consumed. This is because oxygen is abundant in the upstream portion, but is consumed sequentially by the progress of partial oxidation reforming, and contained oxygen is relatively low in the downstream portion. In this way, since the occurrence of partial oxidation reforming varies gradually along the fuel flow path in the cell stack 21, a large temperature gradient may be generated in the cell stack 21.

$$CH_4 + 1/2 O_2 \rightarrow CO + 2H_2 \tag{1}$$

$$CH_4 + 2O_2 \rightarrow CO_2 + 2H_2O \tag{2}$$

Steam reforming is a reforming reaction in which the raw fuel is partially oxidized by reacting the raw fuel or the reformed fuel with water (steam) in order to obtain the reformed fuel. For example, when the raw fuel is methane, steam reforming proceeds mainly by an oxidation reaction shown in the following (3) or (4). Steam reforming may proceed using newly supplied water or water generated by partial oxidation reforming (particularly, complete combustion). In the present embodiment, the cell stack 21 performs steam reforming using water generated by partial oxidation reforming. Steam reforming is an endothermic reaction.

$$CH_4 + H_2O \rightarrow CO + 3H_2 \tag{3}$$

$$CH_4 + 2H_2O \rightarrow CO_2 + 4H_2 \tag{4}$$

Carbon dioxide reforming is a reforming reaction in which the raw fuel or the reformed fuel is partially oxidized to obtain the reformed fuel, by reacting the raw fuel, or the reformed fuel reformed by partial oxidation reforming or steam reforming, with carbon dioxide ($CO_2$). For example, when the raw fuel is methane, carbon dioxide reforming proceeds mainly by partial oxidation reaction shown in the following (5). Carbon dioxide reforming may proceed by using newly supplied carbon dioxide or carbon dioxide generated by partial oxidation reforming (particularly, complete combustion) or steam reforming. In the present embodiment, the cell stack 21 performs carbon dioxide reforming using carbon dioxide generated by partial oxidation reforming and/or steam reforming. Carbon dioxide reforming is an endothermic reaction.

$$CH_4 + CO_2 \rightarrow 2CO + 2H_2 \tag{5}$$

The fuel cell 20 is, for example, a solid oxide fuel cell (SOFC). When the fuel cell 20 is the SOFC, the cell stack 21 includes the first flow path 23 which is a flow path of a raw fuel and/or a reformed fuel (hereinafter, simply referred to as a fuel unless a distinction is necessary), a second flow path 24 which is a flow path of an oxidant gas, and an electrolyte (not shown) made of a solid oxide. The cell stack 21 has a structure in which the first flow path 23 and the second flow path 24 are adjacent to each other via the electrolyte. Therefore, the internal reforming catalyst 22 is provided in the first flow path 23 which is the flow path of the fuel. An electrode (hereinafter, referred to as an anode) configured to act as a negative electrode is provided on a surface of the electrolyte in the first flow path 23, and an electrode (hereinafter, referred to as a cathode) configured to act as a positive electrode is provided on a surface of the electrolyte in the second flow path 24. In the present embodiment, the internal reforming catalyst 22 is separate from the anode, but a part or all of the anode may act as the internal reforming catalyst 22. The internal reforming catalyst 22 is provided substantially uniformly throughout the cell stack 21. That is, the internal reforming catalyst 22 is provided not only in a specific portion of the first flow path 23, and the raw fuel may be reformed substantially at any portion of the first flow path 23 in the cell stack 21.

The fuel cell 20 includes an anode inlet A1, an anode outlet A2, a cathode inlet C3, and a cathode outlet C4.

The anode inlet A1 is an end portion on an upstream side of the first flow path 23, and is an inlet of the raw fuel to the fuel cell 20. Therefore, the anode inlet A1 is connected to the fuel flow rate adjustment device 31 via a fuel supply path 32. On the other hand, the anode outlet A2 is an end portion on a downstream side of the first flow path 23, and discharges the used fuel, a gas generated by the power generation, and the like (hereinafter, referred to as a discharged fuel (an anode off-gas)) to an outside of the fuel cell 20. In the present embodiment, the anode outlet A2 is connected to the combustor 51 via a fuel discharge path 34.

The cathode inlet C3 is an end portion on an upstream side of the second flow path 24, and is an inlet of the oxidant gas to the fuel cell 20. In the present embodiment, the cathode inlet C3 is connected to the oxidant gas supply device 41 via an oxidant gas supply path 42. On the other hand, the cathode outlet C4 is an end portion on a downstream side of the second flow path 24, and discharges the used oxidant gas for the power generation, a gas generated by the power generation, and the like (hereinafter, referred to as a discharged oxidant gas (a cathode off-gas)) to the outside of the fuel cell 20. In the present embodiment, the cathode outlet C4 is connected to the combustor 51 via an oxidant gas discharge path 44.

The fuel cell 20 supplies a power to an apparatus, a device, or the like connected to the fuel cell 20. The apparatus, the device, or the like connected to the fuel cell 20 is, for example, a storage battery, or a motor used as a drive source of an electric vehicle. In the present embodiment, although not shown, the fuel cell 20 is connected to a storage battery connected to a motor for driving an electric vehicle. Therefore, the fuel cell 20 acts as an energy source that indirectly drives the electric vehicle.

The fuel flow rate adjustment device 31 is a device (a fuel supply device) that supplies the raw fuel to the fuel cell 20, and is a device that adjusts a flow rate of the raw fuel to be supplied to the fuel cell 20. The fuel flow rate adjustment device 31 is connected to the anode inlet A1 via the fuel supply path 32. The fuel flow rate adjustment device 31 includes a fuel tank and an injector. The fuel tank stores the raw fuel, for example, in a liquid state. The injector injects the raw fuel from the fuel tank into the fuel supply path 32. Accordingly, the fuel flow rate adjustment device 31 supplies the raw fuel to the fuel cell 20. A timing at which the fuel flow rate adjustment device 31 supplies the raw fuel to the fuel cell 20, a supply amount of the raw fuel, and the like are controlled by the controller 12. The fuel flow rate adjustment device 31 may include a heat exchanger or the like as necessary. In this case, the fuel flow rate adjustment device 31 can adjust a temperature, a phase, a pressure, and the like of the raw fuel by heating, heat exchange, or the like. In the present embodiment, the fuel flow rate adjustment device 31 vaporizes the raw fuel and supplies the vaporized raw fuel to the fuel cell 20.

The air flow rate adjustment device 33 is connected to the fuel supply path 32, and is a device (an air supply device) that mixes the raw fuel to be supplied to the fuel cell 20 by the fuel flow rate adjustment device 31 with air as necessary, and is a device that adjusts a flow rate of the air to be mixed with the raw fuel. The air flow rate adjustment device 33 is, for example, an air blower. A purpose of mixing the raw fuel with the air by the air flow rate adjustment device 33 is to occur partial oxidation reforming in the cell stack 21 or to promote partial oxidation reforming occurred in the cell stack 21 by including oxygen in the raw fuel. Therefore, it is sufficient for the air flow rate adjustment device 33 to be able to mix the oxygen with the raw fuel as necessary. Therefore, the air flow rate adjustment device 33 may be configured to mix the raw fuel with oxygen alone, a gas other than air containing oxygen, air whose constituent components, temperature, and the like are adjusted, or the like, instead of natural air. A timing at which the air flow rate adjustment device 33 mixes the raw fuel with the air, an amount of air to be mixed with the raw fuel, and the like are controlled by the controller 12.

The oxidant gas supply device 41 is a device that supplies the oxidant gas to the fuel cell 20, and is connected to the cathode inlet C3 via the oxidant gas supply path 42. In the present embodiment, the oxidant gas is air containing oxygen used for the power generation by the fuel cell 20. That is, in the present embodiment, the oxidant gas supply device 41 is an air blower.

The heat exchanger 43 is provided in the oxidant gas supply path 42, and heats the oxidant gas by heat exchange. Therefore, the heat exchanger 43 supplies the heated oxidant gas to the fuel cell 20. The heat exchange for heating the oxidant gas is performed with a gas discharged from the combustor 51 (hereinafter, referred to as a discharged gas).

The discharged fuel is supplied from the fuel cell 20 to the combustor 51 via the fuel discharge path 34. The discharged oxidant gas is supplied from the fuel cell 20 to the combustor 51 via the oxidant gas discharge path 44. The combustor 51 combusts the discharged fuel and the discharged oxidant gas by, for example, catalytic combustion. The discharged gas generated as a result of the combustion is discharged from a gas discharge path 52 to an outside of the fuel cell system 10 via the heat exchanger 43. Therefore, heat generated by the electrochemical reaction in the fuel cell 20, the generation of the discharged gas, and the like is used for heating the oxidant gas in the oxidant gas supply path 42 by the heat exchange in the heat exchanger 43.

The temperature sensor 60 is provided in the oxidant gas discharge path 44. The temperature sensor 60 detects a temperature of the discharged oxidant gas that is the oxidant gas discharged from the fuel cell 20, more specifically, the oxidant gas discharged from the second flow path 24. The temperature sensor 60 inputs the detected temperature of the discharged oxidant gas to the controller 12.

The controller 12 performs a temperature control of the fuel cell 20 based on the temperature of the discharged oxidant gas detected by the temperature sensor 60. Particularly, in the present embodiment, the controller 12 performs the temperature control of the fuel cell 20 with heat generated by partial oxidation reforming in the cell stack 21. A specific method by which the controller 12 performs the temperature control of the fuel cell 20 will be described in detail later. The controller 12 is a computer or a microcomputer implemented by using a processor such as a CPU and a GPU, a memory, and the like. The controller 12 may be implemented as a dedicated computer for controlling the fuel cell system 10, or may be implemented as a part of a computer for controlling other devices, systems, or the like. For example, when the fuel cell system 10 is mounted on an electric vehicle, a vehicle controller that controls driving and the like of the electric vehicle may be made to act as the controller 12 of the fuel cell system 10. The controller 12 may be implemented as a server type computer that controls the power generation device 11 by communicating with the power generation device 11.

Figure 2:
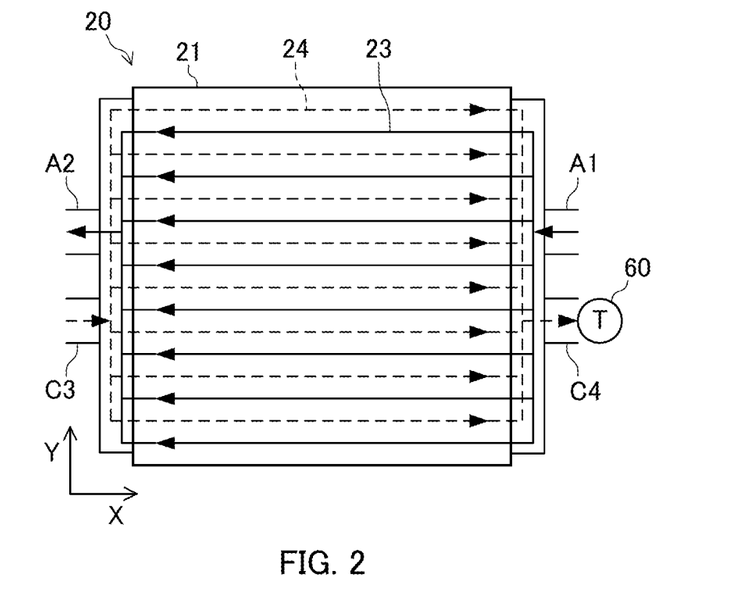
FIG. 2 is an explanatory diagram showing a flow path of a fuel and a flow path of an oxidant gas in a cell stack.

FIG. 2 is an explanatory diagram showing a flow path of a fuel and a flow path of an oxidant gas in the cell stack 21 in the present embodiment. As shown in FIG. 2, the first flow path 23 is a flow path that supplies the fuel to the cell stack 21. The second flow path 24 is a flow path that supplies the oxidant gas to the cell stack 21 such that the oxidant gas flows oppositely to the fuel. The first flow path 23 and the second flow path 24 are parallel in shape as a flow path, but a direction in which the fuel flows through the first flow path 23 and a direction in which the oxidant gas flows through the second flow path 24 are opposite to each other. Therefore, in consideration of the flow directions of the fuel and the oxidant gas, the first flow path 23 and the second flow path 24 are reverse parallel or antiparallel, and the fuel and the oxidant gas form a so-called counter flow. As will be described later, the second flow path 24 may be a flow path that supplies the oxidant gas to the cell stack 21 such that the oxidant gas flows orthogonally to the fuel.

Figure 3:
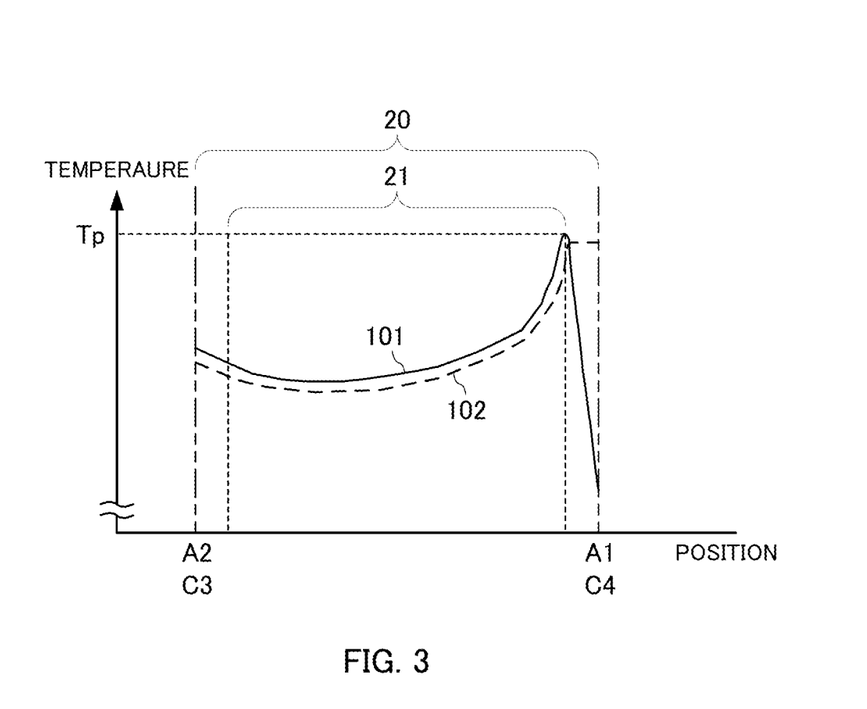
FIG. 3 is a schematic graph showing a temperature distribution in a fuel cell when partial oxidation reforming is performed.

FIG. 3 is a schematic graph showing a temperature distribution in the fuel cell 20 when partial oxidation reforming is performed. FIG. 3 shows the temperature distribution in the fuel cell 20 formed when the cell stack 21 reaches or exceeds a temperature at which partial oxidation reforming may be occurred as a whole and partial oxidation reforming occurs on the cell stack 21. The temperature at which partial oxidation reforming may be occurred is, for example, about 300° C. or higher. A horizontal axis represents a position along the first flow path 23 and the second flow path 24. The cells constituting the cell stack 21 are stacked in a direction of a vertical axis. A graph 101 indicated by a solid line represents a temperature of the fuel in the fuel cell 20, and a graph 102 indicated by a broken line represents a temperature of the oxidant gas. The temperatures of the fuel and the oxidant gas in the cell stack 21 may be considered to be substantially the same as a temperature of the fuel cell 20.

When the raw fuel is supplied from the anode inlet A1, for example, at ordinary temperature, and the raw fuel reaches the cell stack 21, partial oxidation reforming, which is an exothermic reaction, is occurred. As a result, as shown in the graph 101, the temperatures of the fuel and the fuel cell 20 increase in accordance with an amount of partial oxidation reforming occurred. As described above, a relatively large amount of partial oxidation reforming is occurred on an anode inlet A1 side where the oxygen is abundant, and a relatively small amount of partial oxidation reforming is occurred on an anode outlet A2 side where the oxygen has been consumed. Therefore, as shown in the graph 101, partial oxidation reforming forms a temperature distribution in the fuel cell 20 in which the temperature generally decreases from the anode inlet A1 to the anode outlet A2. According to the temperature distribution, the fuel cell 20 has a highest temperature Tp at a predetermined position (the anode inlet A1 or a position in the vicinity of the anode inlet A1) biased toward the anode inlet A1 side, rather than a position of a central portion of the fuel cell 20.

As shown in the graph 102, a temperature distribution of the oxidant gas follows the temperature distribution formed by partial oxidation reforming as described above, and is substantially the same temperature distribution at least in the cell stack 21. This is because the fuel and the oxidant gas flow in the cell stack 21 via the electrolyte, which is a thin film, in an integrated manner on front and back sides, and thus have substantially the same temperature due to mutual heat exchange. Therefore, the discharged oxidant gas discharged from the cathode outlet C4 is discharged at a temperature substantially equal to a maximum temperature in the temperature distribution formed by partial oxidation reforming, or at a temperature correlated with the maximum temperature in the temperature distribution formed by partial oxidation reforming. The temperature correlated with the maximum temperature refers to a temperature by which a maximum temperature of the fuel cell 20 can be calculated or estimated based on a certain relationship of the temperature with the maximum temperature of the fuel cell 20.

The temperature sensor 60 detects the temperature of the discharged oxidant gas. As a result, the temperature sensor 60 detects the maximum temperature of the fuel cell 20 or a temperature correlated with the maximum temperature of the fuel cell 20. The controller 12 performs the temperature control of the fuel cell 20 based on the temperature of the discharged oxidant gas detected by the temperature sensor 60, thereby performing the temperature control of the fuel cell 20 based on the maximum temperature of the fuel cell 20.

In the present embodiment, the fuel and the oxidant gas form the counter flow, and thus the temperature of the discharged oxidant gas is substantially equal to the maximum temperature in the temperature distribution formed by partial oxidation reforming. Therefore, the temperature sensor 60 substantially detects the maximum temperature of the fuel cell 20 by detecting the temperature of the discharged oxidant gas. The controller 12 directly performs the temperature control of the fuel cell 20 based on the maximum temperature of the fuel cell 20 by using the temperature of the discharged oxidant gas detected by the temperature sensor 60.

The temperature of the fuel cell 20 decreases in a central portion of the cell stack 21 because steam reforming and/or carbon dioxide reforming, which is an endothermic reaction, proceed. The temperature of the fuel cell 20 increases from the central portion of the cell stack 21 to the anode outlet A2 and the cathode inlet C3 because the heated oxidant gas is supplied from the cathode inlet C3.

Figure 4:
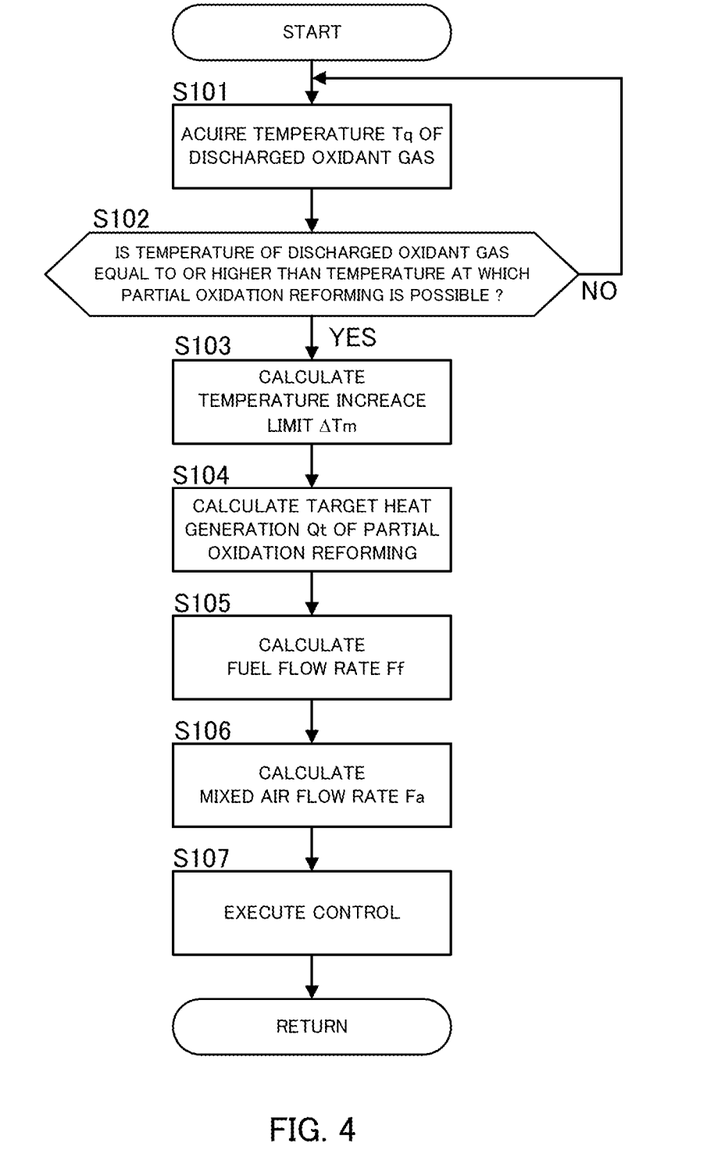
FIG. 4 is a flowchart for a temperature control of the fuel cell.

Hereinafter, a method in which the controller 12 controls the temperature of the fuel cell 20 with the heat generated by partial oxidation reforming in the cell stack 21 will be described. FIG. 4 is a flowchart for the temperature control of the fuel cell 20. That is, when the temperature control of the fuel cell 20 is performed with the heat generated by partial oxidation reforming in the cell stack 21, the controller 12 controls the temperature of the fuel cell 20 by repeatedly performing a discharged oxidant gas temperature acquisition step S101, a determination step S102, a temperature increase limit calculation step S103, a target heat generation calculation step S104, a fuel flow rate calculation step S105, a mixed air flow rate calculation step S106, and a control execution step S107 in this order at predetermined time intervals. The "temperature control of the fuel cell 20" particularly refers to a control performed in the temperature increase limit calculation step S103, the target heat generation calculation step S104, the fuel flow rate calculation step S105, the mixed air flow rate calculation step S106, and the control execution step S107.

In the discharged oxidant gas temperature acquisition step S101, the controller 12 acquires the temperature of the discharged oxidant gas detected by the temperature sensor 60. That is, the controller 12 is configured to act as a discharged oxidant gas temperature acquisition unit. During a warm-up operation of the fuel cell system 10 (before the occurrence of partial oxidation reforming), a temperature on a cathode outlet C4 side (the anode inlet A1 side) decreases. Therefore, during the warm-up operation, the controller 12 can determine whether a temperature of the fuel cell 20 reaches a temperature at which partial oxidation reforming is possible, based on the temperature of the discharged oxidant gas detected by the temperature sensor 60 that reflects the temperature. On the other hand, when partial oxidation reforming is occurred, the temperature of the discharged oxidant gas detected by the temperature sensor 60 reflects the heat generated by partial oxidation reforming and is a temperature substantially equal to the maximum temperature of the fuel cell 20. Therefore, after the occurrence of partial oxidation reforming, the controller 12 regards the temperature of the discharged oxidant gas acquired from the temperature sensor 60 as the maximum temperature of the fuel cell 20, and performs the following steps for controlling the temperature of the fuel cell 20. The temperature of the discharged oxidant gas may be corrected as necessary, when the temperature of the discharged oxidant gas may have deviation from the maximum temperature of the fuel cell 20 due to an operating state of the fuel cell 20 or the like and it may cause an error in control. In this case, the controller 12 performs the following steps in consideration of a correlation between the temperature of the discharged oxidant gas and the maximum temperature of the fuel cell 20. When estimating the maximum temperature of the fuel cell 20 by using the temperature of the discharged oxidant gas, for example, a map may be used that associate the temperature of the discharged oxidant gas and the maximum temperature of the fuel cell.

In the determination step S102, the controller 12 determines whether the temperature of the discharged oxidant gas is equal to or higher than the temperature at which oxidation reforming is possible. That is, the controller 12 is configured to act as a determination unit. When the temperature of the discharged oxidant gas is lower than the temperature at which partial oxidation reforming is possible, the controller 12 continues to acquire the temperature of the discharged oxidant gas at a predetermined cycle without executing the step after the determination step S102. This is because, in a case where the temperature of the discharged oxidant gas, that is, even the maximum temperature of the fuel cell 20, does not reach the temperature at which partial oxidation reforming can be performed, partial oxidation reforming is not occurred, and thus the heat cannot be used for the temperature control of the fuel cell 20. When the temperature of the discharged oxidant gas is equal to or higher than the temperature at which partial oxidation reforming is possible, the controller 12 performs the temperature increase limit calculation step S103.

In the temperature increase limit calculation step S103, the controller 12 calculates a temperature increase limit $\Delta Tm$ using a detected temperature Tq of the discharged oxidant gas. That is, the controller 12 is configured to act as a temperature increase limit calculation unit. The temperature increase limit ΔTm is a temperature obtained by subtracting the detected temperature Tq of the discharged oxidant gas from a heatproof limit temperature of a component having a lowest heatproof (hereinafter, simply referred to as a heatproof limit temperature) among the cell stack 21 and other components constituting the fuel cell 20. In the present embodiment, a heatproof limit temperature Tk of the internal reforming catalyst 22 is the lowest among heatproof limit temperatures of the cell stack 21 and the other components of the fuel cell 20. Therefore, the controller 12 calculates the temperature increase limit ΔTm by ΔTm=Tk−Tq.

In the target heat generation calculation step S104, the controller 12 calculates a predetermined target heat generation Qt based on the temperature Tq of the discharged oxidant gas. Accordingly, in the temperature control of the fuel cell 20, the controller 12 sets the target heat generation Qt such that the temperature Tq of the discharged oxidant gas does not exceed the heatproof limit temperature Tk of the internal reforming catalyst 22. That is, the controller 12 is configured to act as a target heat generation calculation unit and/or a target heat generation setting unit. The target heat generation Qt is a target value of a heat generation of partial oxidation reforming. The target heat generation Qt is a target value of a heat generation per predetermined time (for example, a detection cycle of the temperature Tq of the discharged oxidant gas). For example, the target heat generation Qt can be obtained by a product of the temperature increase limit ΔTm, a specific heat Sh of the cell stack 21 or the cells, and a mass Mc of the cells in which partial oxidation reforming is occurred, that is, Qt=ΔTm×Sh×Mc. The controller 12 calculates, based on the heat generation obtained from a reaction formula of partial oxidation reforming, a flow rate of a fuel (and oxygen) for achieving the target heat generation Qt.

In the fuel flow rate calculation step S105, the controller 12 calculates a fuel flow rate Ff, which is a flow rate of the raw fuel, based on the target heat generation Qt. That is, the controller 12 is configured to act as a fuel flow rate calculation unit. The fuel flow rate Ff is a flow rate of the raw fuel necessary for achieving the target heat generation Qt by partial oxidation reforming. When power generation is started in the cell stack 21, the fuel flow rate Ff calculated in the fuel flow rate calculation step S105 is a flow rate of the raw fuel for maintaining the power generation while achieving the target heat generation Qt.

In the mixed air flow rate calculation step S106, the controller 12 calculates a mixed air flow rate Fa, which is an amount of air to be mixed with the raw fuel, based on the target heat generation Qt. That is, the controller 12 is configured to act as a mixed air flow rate calculation unit. The mixed air flow rate Fa is a flow rate of the air necessary to be mixed with the raw fuel in order to achieve the target heat generation Qt by partial oxidation reforming. When the power generation is started in the cell stack 21, the mixed air flow rate Fa is a flow rate of air containing oxygen corresponding to an amount of partial oxidation reforming to be occurred.

In the control execution step S107, the controller 12 controls the fuel flow rate adjustment device 31 and the air flow rate adjustment device 33 so as to achieve the calculated fuel flow rate Ff and mixed air flow rate Fa. That is, the controller 12 controls the fuel flow rate Ff and the mixed air flow rate Fa such that the heat generation of partial oxidation reforming in the cell stack 21 is the target heat generation Qt. Therefore, the controller 12 is configured to act as a fuel flow rate control unit that controls, by using the fuel flow rate adjustment device 31, the flow rate of the raw fuel to be supplied to the fuel cell 20. The controller 12 is also configured to act as a mixed air flow rate control unit that controls, by using the air flow rate adjustment device 33, the flow rate of the air to be mixed with the raw fuel. In this way, by controlling the fuel flow rate Ff and the mixed air flow rate Fa, the temperature of the fuel cell 20 is controlled within a range not exceeding the heatproof limit temperature Tk of the internal reforming catalyst 22 even when a temperature distribution that decreases from the anode inlet A1 to the anode outlet A2 is generated inside the fuel cell 20 by partial oxidation reforming. Therefore, even when the fuel is reformed by partial oxidation reforming inside the cell stack 21, the fuel cell system 10 can continuously and efficiently operate without damaging the internal reforming catalyst 22.

As described above, the temperature control of the fuel cell 20 performed with the heat generated by partial oxidation reforming in the cell stack 21 is particularly useful in an operation scene in which the warm-up operation is performed at the time of starting the fuel cell system 10 and in an operation scene in which the temperature of the cell stack 21 is recovered when the temperature of the cell stack 21 decreases due to steam reforming or the like. Hereinafter, these operation scenes will be described in detail.

Figure 5:
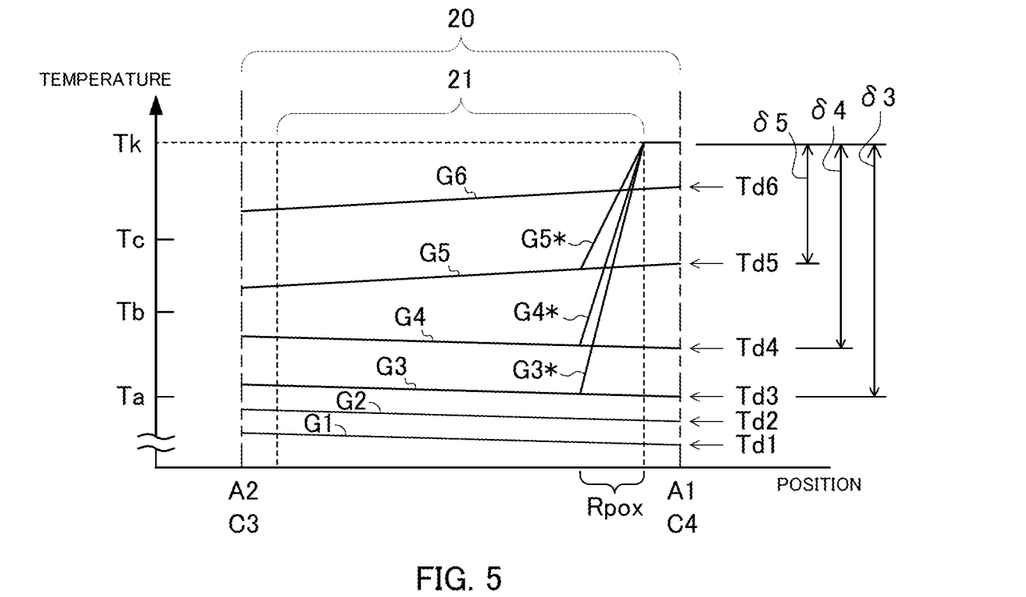
FIG. 5 is a graph schematically showing a temperature control in a warm-up operation.

FIG. 5 is a graph schematically showing a temperature control in the warm-up operation. A temperature Ta is the temperature at which partial oxidation reforming is possible, and is, for example, about 300° C. A temperature Tb is a temperature at which power generation is possible when the fuel cell 20 is a solid oxide fuel cell, and is, for example, about 500° C. A temperature Tc is a temperature that is maintained during a steady operation in consideration of power generation efficiency when the fuel cell 20 is a solid oxide fuel cell, and is, for example, about 800° C. to about 1000° C. Graphs G1 to G6 in FIG. 5 represent respective temperatures of the oxidant gas measured at predetermined time intervals.

When the fuel cell system 10 is started and the fuel cell 20 is to be warmed up to a temperature range in which the power generation is possible, the fuel cell 20 has a temperature lower than the temperature at which the power generation is possible. Therefore, the controller 12 supplies the oxidant gas and the raw fuel to the combustor 51 and thereby warm up the fuel cell 20 by flowing the heated oxidant gas. Accordingly, as shown in the graph G1 and the graph G2, the fuel cell 20 is gradually warmed and approaches the temperature at which the power generation is possible. A temperature Td1 is the temperature Tq of the discharged oxidant gas at a time of the graph G1. A temperature Td2 is the temperature Tq of the discharged oxidant gas at a time of the graph G2.

Here, when the above warm-up operation using heated oxidant gas is continued, as shown by intervals of the graphs G1 to G3, the fuel cell 20 warms up slowly, and it takes a long time for the fuel cell 20 to reach the temperature at which the power generation is possible. Therefore, as shown in the graph G3, when the temperature Tq of the discharged oxidant gas reaches a temperature Td3 and is equal to or higher than the temperature Ta at which partial oxidation reforming is possible, the controller 12 calculates a temperature increase limit 63 which is the temperature increase limit ΔTm at a time of the graph G3 by subtracting the detected temperature Td3 of the discharged oxidant from the heatproof limit temperature Tk. The controller 12 calculates the target heat generation Qt based on the temperature increase limit 63, and further calculates the fuel flow rate Ff and the mixed air flow rate Fa based on the calculated target heat generation Qt. Thereafter, when the controller 12 controls the fuel flow rate adjustment device 31 and the air flow rate adjustment device 33 according to the calculated fuel flow rate Ff and mixed air flow rate Fa, partial oxidation reforming proceeds in a predetermined range Rpox of the cell stack 21 as shown in a graph G3*. As a result, a temperature of the predetermined range Rpox increases with the heat generated by partial oxidation reforming. However, even in the predetermined range Rpox, a maximum temperature of the fuel cell 20 is equal to or lower than the heatproof limit temperature Tk.

The heat generated by partial oxidation reforming in the graph G3* propagates through the cell stack 21. Therefore, at a next timing of detecting the temperature Tq of the discharged oxidant gas as shown in the graph G4, an interval between the graph G3 and the graph G4 is larger than the intervals between the graphs G1 to G3. That is, in the operation scene in which the warm-up operation is performed, the warm-up of the fuel cell 20 is promoted by occurring partial oxidation reforming.

At the time of the graph G4, the temperature Tq of the discharged oxidant gas is a temperature Td4, which is lower than the temperature Tb at which the power generation is possible, but higher than the temperature Ta at which partial oxidation reforming is possible. Therefore, as described above, the controller 12 gives rise to partial oxidation reforming again in the cell stack 21, and promotes the warm-up of the fuel cell 20 with the heat of partial oxidation reforming. That is, the controller 12 calculates a temperature increase limit 64 at the time of the graph G4. Then, the controller 12 calculates the target heat generation Qt based on the temperature increase limit 64, and further calculates and controls the fuel flow rate Ff and the mixed air flow rate Fa based on the calculated target heat generation Qt. Accordingly, as shown in a graph G4*, partial oxidation reforming is occurred in the predetermined range Rpox of the cell stack 21, and the heat is propagated to promote the warm-up of the fuel cell 20 again.

Since the temperature increase limit 64 at the time of the graph G4 is smaller than the temperature increase limit 63 at the time of the graph G3, the target heat generation Qt at the time of the graph G4 is naturally smaller than the target heat generation Qt at the time of the graph G3. The fuel flow rate Ff and the mixed air flow rate Fa at the time of the graph G4 are also smaller than the fuel flow rate Ff and the mixed air flow rate Fa at the time of the graph G3. As a result, a heat generation of partial oxidation reforming occurred in the predetermined range Rpox of the cell stack 21 is reduced at the time of the graph G4 than at the time of the graph G3. As a result, even when partial oxidation reforming is additionally occurred at the time of the graph G4, the maximum temperature of the fuel cell 20 is maintained at a value equal to or lower than the heatproof limit temperature Tk.

Thereafter, as shown in the graph G5, when the temperature Tq of the discharged oxidant gas becomes a temperature Td5 and exceeds the temperature Tb at which the power generation is possible, the power generation is started in the cell stack 21 by the supply of the fuel and the oxidant gas. Generally, the fuel cell 20 has higher power generation efficiency as the temperature increases. Therefore, the fuel cell 20 is operated while maintaining a high temperature as much as possible within a range equal to or lower than the heatproof limit temperature Tk. Therefore, even after the power generation is started, as shown by the graph G5, when the target temperature Tc of the steady operation is not achieved, the controller 12 continues to warm up the fuel cell 20 in the same manner as described above. That is, the controller 12 calculates a temperature increase limit 65 at a time of the graph G5. Then, the controller 12 calculates the target heat generation Qt based on the temperature increase limit 65, and further calculates and controls the fuel flow rate Ff and the mixed air flow rate Fa based on the calculated target heat generation Qt. Accordingly, as shown in the graph G4*, partial oxidation reforming is generated in the predetermined range Rpox of the cell stack 21, and the heat is propagated to promote the warm-up of the fuel cell 20. As a result, at a time of the graph G6, the temperature Tq of the discharged oxidant gas is a temperature Td6, and the temperature of the entire fuel cell 20 also exceeds the temperature Tc to be maintained during the steady operation. Accordingly, as compared with a case where the warm-up operation is performed by flowing the oxidant gas heated only by a heater or the combustor 51 as in related art, the warm-up operation is completed in a short time, and the fuel cell system 10 can shift to the steady operation in which the power generation is performed in the cell stack 21.

Figure 6:
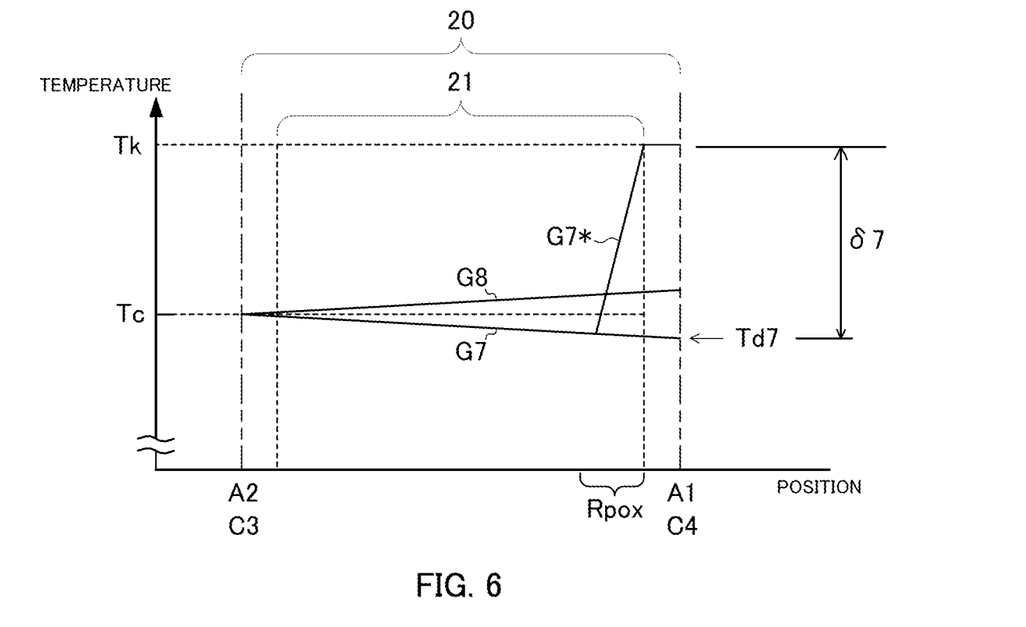
FIG. 6 is a graph schematically showing a temperature control in a steady operation.

FIG. 6 is a graph schematically showing a temperature control in steady operation. Even when the temperature of the fuel cell 20 generally exceeds the temperature Tc that is should to be maintained during the steady operation and the steady operation is continued, the temperature of the fuel cell 20 may decrease due to endothermic of steam reforming or the like, a load on the fuel cell 20, or the like. For example, when an output power required for the fuel cell 20 is at a middle or low level, and the steady operation is performed with a low load or a middle load on the fuel cell 20, the temperature distribution in the fuel cell 20 becomes a temperature distribution in which the temperature generally increases from the cathode inlet C3 to the cathode outlet C4. This is because, when the fuel cell 20 of the present embodiment is operated at low or middle load, the heat generated by the power generation is small, but endothermic of steam reforming or the like is even smaller, and thus the heat generated by the power generation becomes higher than endothermic of steam reforming or the like. On the other hand, when an output power required for the fuel cell 20 is large and a load on the fuel cell 20 is high, the temperature distribution in the fuel cell 20 may become a temperature distribution in which the temperature decreases from the cathode inlet C3 to the cathode outlet C4. This is because, when the fuel cell 20 of the present embodiment is operated at high load, the heat generated by the power generation is large, but endothermic of steam reforming or the like is further large, and thus the heat generated by the power generation becomes lower than endothermic of steam reforming or the like. In this way, when the steady operation is continued in a state where the fuel cell 20 has a high load, for example, as shown in a graph G7, the temperature of the fuel cell 20 may become lower than the temperature Tc to be maintained during the steady operation even after the start of the steady operation. In such a state, when the steady operation is simply continued, the temperature may be subsequently lower than the temperature Tb at which the power generation is possible, and the power generation may not be continued.

Therefore, the controller 12 continues to detect the temperature Tq of the discharged oxidant gas even after shifting to the steady operation. Then, when the temperature Tq of the discharged oxidant gas is equal to or lower than the temperature Tc to be maintained during the steady operation, the controller 12 heats the fuel cell 20 with the heat generated by partial oxidation reforming. For example, as shown in the graph G7, when the temperature Tq of the discharged oxidant gas becomes a temperature Td7 and becomes lower than the temperature Tc to be maintained during the steady operation, the controller 12 calculates a temperature increase limit 67. Then, the controller 12 calculates the target heat generation Qt based on the temperature increase limit 67, and further calculates and controls the fuel flow rate Ff and the mixed air flow rate Fa based on the calculated target heat generation Qt. Accordingly, as shown in a graph G7*, partial oxidation reforming is occurred in the predetermined range Rpox of the cell stack 21. As the heat generated by partial oxidation reforming propagates, the temperature of the fuel cell 20 is equal to or higher than the temperature Tc to be maintained during the steady operation, as shown in a graph G8. As a result of the temperature control, the fuel cell 20 can continue the power generation while satisfying the required output power even when the high load state continues. Also, in a case of performing the temperature control for maintaining the temperature of the fuel cell 20 at a temperature equal to or higher than the temperature Tc to be maintained during the steady operation as described above, the controller 12 performs the temperature control based on the temperature Tq of the discharged oxidant gas, and thus the temperature of the fuel cell 20 does not exceed the heatproof limit temperature Tk even when observing locally. Therefore, the fuel cell system 10 can stably continue the steady operation without damaging the fuel cell 20 or the like.

As described above, a control method for the fuel cell system according to the embodiment is a control method for the fuel cell system 10 includes the fuel cell 20 including the cell stack 21 that has the internal reforming catalyst 22 for generating hydrogen from hydrocarbon, the first flow path 23 that supplies a fuel containing hydrocarbon to the cell stack 21, and the second flow path 24 that supplies the oxidant gas to the cell stack 21 such that the oxidant gas flows oppositely or orthogonally to the fuel. Wherein, the control method includes detecting the temperature Tq of the discharged oxidant gas that is the oxidant gas discharged from the second flow path 24 and performing the temperature control of the fuel cell 20 based on the temperature Tq of the discharged oxidant gas.

In the control method for the fuel cell system 10, as described above, the fuel cell 20 is of the internal reforming type, and thus the temperature may be relatively higher in the vicinity of the anode inlet A1 than in the central portion of the cell stack 21. The fuel cell 20 forms a so-called counter flow or cross flow, and the temperature of the cathode outlet C4 may be regarded as the temperature of the anode inlet A1 which is a relatively high temperature portion. The controller 12 of the fuel cell system 10 performs the temperature control of the fuel cell 20 based on the temperature Tq of the discharged oxidant gas detected at the cathode outlet C4 close to the anode inlet A1. That is, in the control method for the fuel cell system 10 according to the above embodiment, the temperature control is performed based on the temperature of the relatively high temperature portion in the fuel cell 20, and thus it is possible to realize a stable control more reliably while observing the heatproof limit temperature Tk which is a heat resistance standard.

On the other hand, in a case where the temperature control of the fuel cell 20 is performed based on the temperature of the central portion of the fuel cell 20 as in the related art, in an operation scene in which the fuel cell 20 is of the internal reforming type and the temperature is relatively higher in the vicinity of the anode inlet A1 than in the central portion of the cell stack 21, the relatively high temperature portion in the vicinity of the anode inlet A1 may have a temperature exceeding the heatproof limit temperature Tk which is the heat resistance standard, and the fuel cell 20 may be damaged or the like. Therefore, by the control method for the fuel cell system 10 according to the above embodiment, the fuel cell 20 can be operated more reliably and stably without being damaged or the like, as compared with a related-art control method for a fuel cell system.

As an example of a scene in which the vicinity of the anode inlet A1 is more likely to be the relatively high temperature portion than the central portion of the cell stack 21, there is an operation scene in which partial oxidation reforming is generated. Therefore, the above control method for the fuel cell system 10 is particularly suitable when partial oxidation reforming is occurred in the cell stack 21.

For example, when partial oxidation reforming is actively occurred from a low temperature range of about 300° C. in order to promote the warm-up (temperature increase) of the fuel cell 20, the anode inlet A1 side reaches the maximum temperature in the temperature distribution in the fuel cell 20 due to the heat generated by partial oxidation reforming. Therefore, even when partial oxidation reforming is occurred for warming up the fuel cell 20, by detecting the temperature Tq of the discharged oxidant gas with the temperature sensor 60 provided at the cathode outlet C4 and performing the temperature control of the fuel cell 20 based on the detected temperature Tq of the discharged oxidant gas as described above, it is possible to promote the warm-up of the fuel cell 20 within a range not exceeding the heatproof limit temperature Tk even when observing locally. In a case where the fuel and the oxidant gas form the counter flow as in the above embodiment, the temperature Tq of the discharged oxidant gas detected by the temperature sensor 60 is substantially equal to the maximum temperature of the fuel cell 20, and thus the above temperature control can be performed more accurately.

In the control method for the fuel cell system 10 according to the above embodiment, the temperature control of the fuel cell 20 is performed particularly such that the temperature of the fuel cell 20 is equal to or lower than the heatproof limit temperature Tk, which is a predetermined temperature. The heatproof limit temperature Tk is optional. Therefore, the control method for the fuel cell system 10 according to the above embodiment is particularly suitable when the temperature of the fuel cell 20 is controlled to be equal to or lower than the predetermined temperature, and it is possible to realize a stable control in which a risk of damage or the like of the fuel cell 20 and the fuel cell system 10 is reduced.

In addition to the above basic configuration, the fuel cell system 10 according to the above embodiment further includes the fuel flow rate adjustment device 31 that adjusts the flow rate of the fuel to be supplied to the fuel cell 20, and the air flow rate adjustment device 33 that adjusts the flow rate of the air to be mixed with the fuel. In the control method for the fuel cell system 10 according to the above embodiment, specifically, it controls the fuel flow rate Ff which is the flow rate of the fuel and the mixed air flow rate Fa which is the flow rate of the air to be mixed with the fuel such that the heat generation by partial oxidation reforming in the cell stack 21 becomes the predetermined target heat generation Qt based on the temperature Tq of the discharged oxidant gas. Therefore, the control method for the fuel cell system 10 according to the above embodiment realizes the temperature control of the fuel cell 20 in a manner of using partial oxidation reforming that is inevitably generated due to properties of the internal reforming catalyst 22. That is, in the control method for the fuel cell system 10 according to the above embodiment, the temperature control of the fuel cell 20 is realized without requiring preparation of a special heat source or cold source.

In the fuel cell system 10, partial oxidation reforming is actively occurred by mixing the air with the fuel using the air flow rate adjustment device 33. In the fuel cell system 10, the target heat generation Qt is determined based on the temperature Tq of the discharged oxidant gas, and the fuel flow rate Ff and the mixed air flow rate Fa are controlled. As a result, in the fuel cell system 10, the temperature of the fuel cell 20 is controlled by controlling a heat generation of partial oxidation reforming to be occurred. In this way, when the heat generated by partial oxidation reforming is controlled based on the temperature Tq of the discharged oxidant gas, the temperature control of the fuel cell 20 can be suitably performed. Particularly, in a case of warming up the fuel cell 20 and in a case of maintaining the temperature of the fuel cell 20 in order to continuously use the fuel cell 20 at a high load, the fuel cell system 10 can particularly appropriately control the temperature of the fuel cell 20 within the range not exceeding the heatproof limit temperature Tk even when observing locally. Regarding the warm-up of the fuel cell 20, the warm-up can be promoted by the above temperature control using the heat generated by partial oxidation reforming. When the fuel cell 20 is used at a high load, the temperature Tc to be maintained for the steady operation can be maintained.

In the control method for the fuel cell system 10 according to the above embodiment, specifically, the target heat generation Qt is set such that the temperature Tq of the discharged oxidant gas does not exceed the heatproof limit temperature Tk of the internal reforming catalyst 22 which is the reforming catalyst. Accordingly, the temperature of the fuel cell 20 can be more appropriately controlled within the range not exceeding the heatproof limit temperature Tk even when observing locally.

In the control method for the fuel cell system 10 according to the above embodiment, specifically, when the temperature Tq of the discharged oxidant gas is equal to or higher than the temperature at which partial oxidation reforming is possible in the cell stack 21, the temperature control of the fuel cell 20 is performed, for example, by supplying the fuel and the air to be mixed with the fuel. Accordingly, the temperature control of the fuel cell 20 using the heat generated by partial oxidation reforming can be performed by properly supplying a mixture of the fuel and the air only when the temperature reaches a temperature range in which partial oxidation reforming is possible. As a result, it is possible to eliminate waste of the fuel and to prevent failures such as precipitation of carbon.

The fuel cell system 10 according to the above embodiment includes: the cell stack 21 including the internal reforming catalyst 22 which is the reforming catalyst for generating hydrogen from hydrocarbon; the first flow path 23 that supplies the fuel containing hydrocarbon to the cell stack 21; the second flow path 24 that supplies the oxidant gas to the cell stack 21 such that the oxidant gas flows oppositely or orthogonally to the fuel; the temperature sensor 60 that detects the temperature Tq of the discharged oxidant gas that is the oxidant gas discharged from the second flow path 24; and the controller 12 that performs the temperature control of the fuel cell 20 based on the temperature Tq of the discharged oxidant gas.

The configuration of the fuel cell system 10 can be changed without departing from the gist of the temperature control of the fuel cell 20 according to the above embodiment. For example, in the above embodiment, an example in which the temperature control of the fuel cell 20 is performed using the heat generated by partial oxidation reforming has been described, but the temperature of the fuel cell 20 may be controlled by a method other than using the heat generated by partial oxidation reforming, such as heating by a heater, when the temperature control of the fuel cell 20 can be performed based on the temperature Tq of the discharged oxidant gas. For example, instead of using the heat generated by partial oxidation reforming, the controller 12 may control an amount of air supplied by the oxidant gas supply device 41 or an amount of a fuel, a discharged gas, and/or new air supplied to the combustor 51 such that the temperature Tq of the discharged oxidant gas is a desired temperature (for example, to comply with a predetermined upper limit temperature). However, as in the above embodiment, the temperature control of the fuel cell 20 using partial oxidation reforming is particularly preferred because a special configuration for controlling the temperature of the fuel cell 20 is not necessary.

Second Embodiment

The fuel cell system 10 according to the above first embodiment includes one internal reforming fuel cell 20 including the cell stack 21 including the internal reforming catalyst 22. Such an internal reforming type fuel cell 20 is used with a somewhat excessive supply of the raw fuel in order to prevent precipitation of carbon or the like. Therefore, a utilization rate of the fuel is low. Therefore, the fuel cell system 10 according to the above first embodiment can improve a fuel utilization rate by further using another fuel cell in combination as follows.

Figure 7:
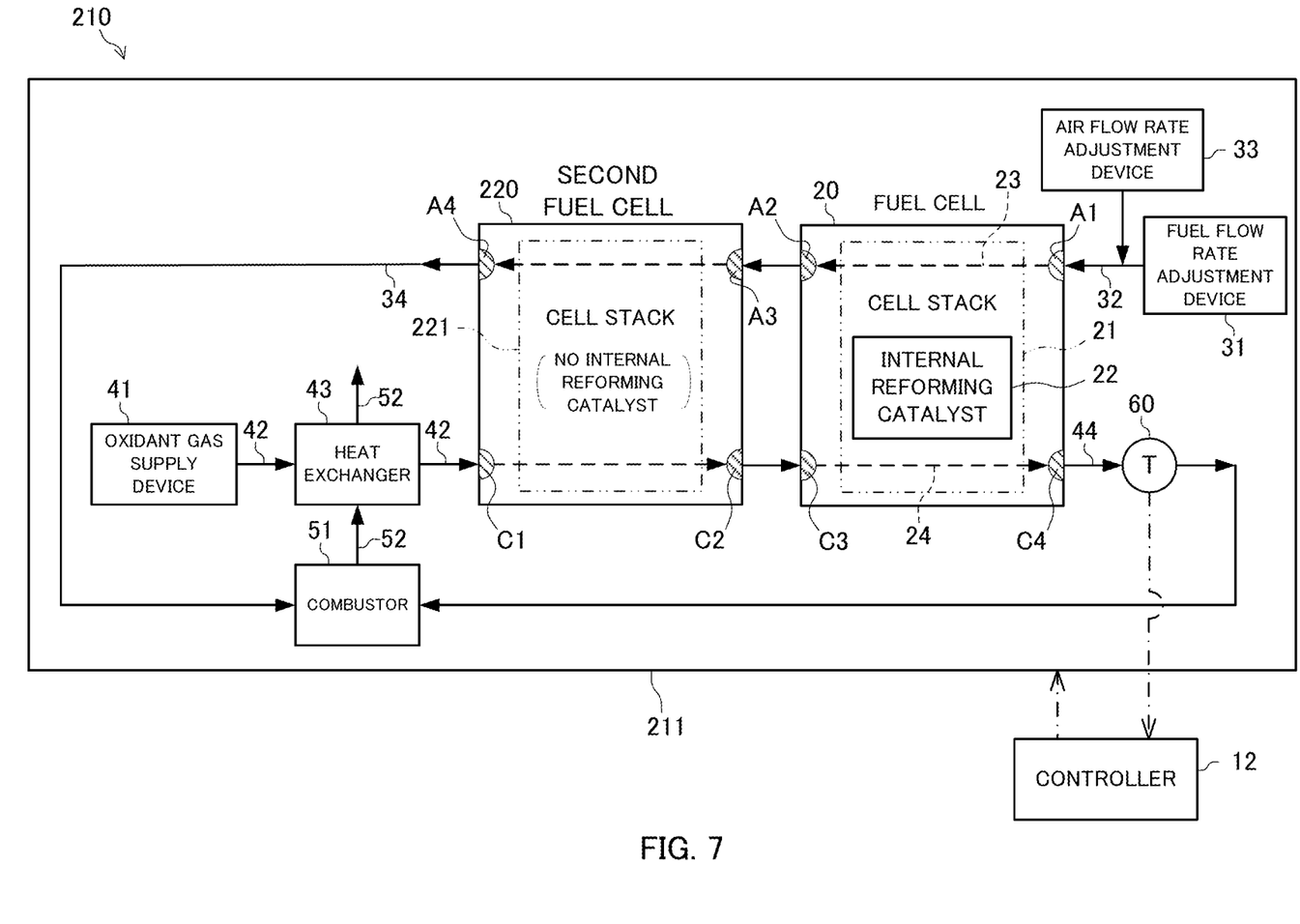
FIG. 7 is a block diagram showing a configuration of a fuel cell system according to a second embodiment.

FIG. 7 is a block diagram showing a configuration of a fuel cell system 210 according to a second embodiment. The fuel cell system 210 according to the second embodiment is obtained by using the fuel cell 20 of the fuel cell system 10 according to the first embodiment as a first fuel cell and adding a second fuel cell 220. Therefore, configurations common to those of the fuel cell system 10 according to the first embodiment are designated by the same reference numerals as those in the first embodiment, and description thereof will be omitted.

The second fuel cell 220 is a fuel cell including a cell stack 221 including a smaller amount of the internal reforming catalyst 22 as compared with the fuel cell 20 as the first fuel cell. In the present embodiment, the cell stack 221 of the second fuel cell 220 is a solid oxide fuel cell that does not include the internal reforming catalyst 22. That is, the second fuel cell 220 generates a power by being supplied with a reformed fuel.

An anode inlet A3 of the second fuel cell 220 is connected to the anode outlet A2 of the fuel cell 20. An anode outlet A4 of the second fuel cell 220 is connected to the combustor 51 via the fuel discharge path 34. That is, a fuel discharged from the fuel cell 20 is supplied to the second fuel cell 220 as a fuel. The raw fuel is supplied with a somewhat excessive, and thus the discharged fuel of the fuel cell 20 is not completely used as the fuel, hydrogen remains, and the discharged fuel can still be used as a fuel. On the other hand, for the discharged fuel of the fuel cell 20, almost all of the raw fuel is reformed into hydrogen by the internal reforming of the fuel cell 20. Therefore, the discharged fuel of the fuel cell 20 is used as the reformed fuel in the second fuel cell 220.

A cathode inlet C1 of the second fuel cell 220 is connected to the oxidant gas supply device 41 via the oxidant gas supply path 42. A cathode outlet C2 of the second fuel cell 220 is connected to the cathode inlet C3 of the fuel cell 20. That is, the second fuel cell 220 uses an oxidant gas supplied from the oxidant gas supply device 41 for power generation. Thereafter, the second fuel cell 220 supplies an oxidant gas discharged from the second fuel cell 220 (a discharged oxidant gas) to the fuel cell 20 as an oxidant gas. The discharged oxidant gas of the second fuel cell 220 contains oxygen, and can also sufficiently act as the oxidant gas in the fuel cell 20.

As described above, the fuel cell system 210 according to the second embodiment includes the second fuel cell 220 in addition to the fuel cell 20 which is the first fuel cell. The fuel discharged from the fuel cell 20 is supplied to the second fuel cell 220. As a result, in the internal reforming fuel cell 20, the raw fuel is supplied and used with a somewhat excessive, and thus the utilization rate of the fuel is low, but the discharged fuel of the fuel cell 20 is reused for the power generation in the second fuel cell 220. Therefore, the fuel cell system 210 can use the raw fuel for the power generation with almost no remain, and can improve the utilization rate of the fuel as compared with the fuel cell system 10 according to the first embodiment.

The fuel cell system 210 according to the second embodiment supplies the discharged oxidant gas, which is the oxidant gas discharged from the second fuel cell 220, to the fuel cell 20 as the oxidant gas. When an endothermic reaction such as steam reforming proceeds inside the fuel cell 20, the temperature of the fuel cell 20 decreases, but as described above, the discharged oxidant gas heated by the power generation in the second fuel cell 220 is supplied to the fuel cell 20 as the oxidant gas, and thus a heat balance between the heat generated by the power generation in the fuel cell 20 and endothermic by fuel reforming can be easily maintained. The fuel cell system 210 as a whole can also easily maintain a heat balance. Therefore, the controller 12 can easily maintain the internal reforming fuel cell 20 in a steady operation more stably and with high efficiency.

For the second fuel cell 220 added in the fuel cell system 210 according to the second embodiment, one with less the internal reforming catalyst 22 that the fuel cell 20 is adopted. Therefore, in the second fuel cell 220, there is less occurrence of endothermic reactions such as steam reforming. Therefore, by supplying the discharged oxidant gas of the second fuel cell 220 to the fuel cell 20, the controller 12 can particularly easily maintain the heat balance between the heat generated by the power generation in the fuel cell 20 and endothermic by the fuel reforming. The fuel cell system 210 as a whole can also easily maintain the heat balance. When the second fuel cell 220 does not include the internal reforming catalyst 22 as in the second embodiment above, it is easiest to maintain the heat balance.

Modification

Figure 8:
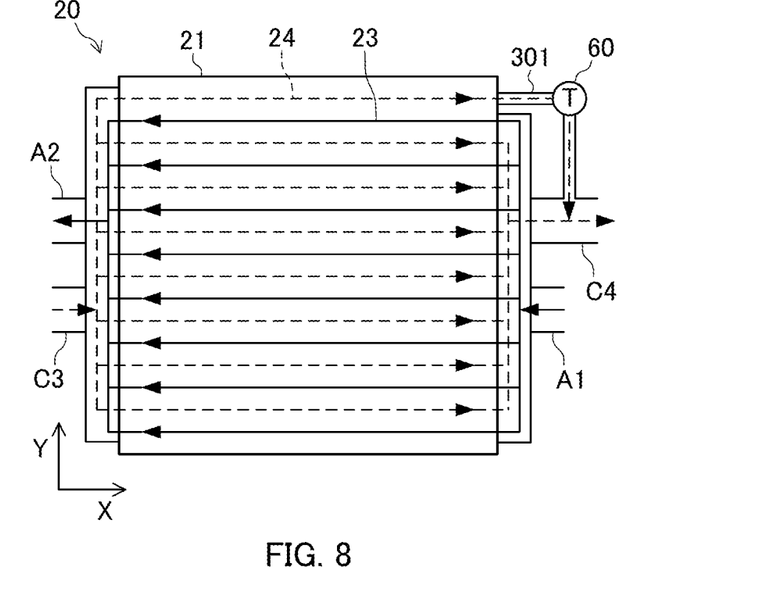
FIG. 8 is an explanatory diagram of a modification in which an attachment position of a temperature sensor is changed.

In the first embodiment and the second embodiment described above, the temperature sensor 60 is provided in the cathode outlet C4 at which a plurality of second flow paths 24 branched in the cell stack 21 are integrated again into one, but arrangement of the temperature sensor 60 can be changed optionally within a range in which the maximum temperature in the temperature distribution in the fuel cell 20 can be detected or estimated. For example, FIG. 8 is an explanatory diagram of a modification in which an attachment position of the temperature sensor 60 is changed. As shown in FIG. 8, a flow path 301 is provided in which a part of the second flow path 24 branched in the cell stack 21 is drawn out and merges into the cathode outlet C4, and the temperature sensor 60 can be provided in the flow path 301. In this way, when the temperature sensor 60 is provided in the flow path 301 in which a part of the second flow path 24 is drawn out, even when a temperature distribution is formed in the fuel cell 20 in a Y direction perpendicular to the first flow path 23 and the second flow path 24 due to convenience of an overall structure of the fuel cell 20, the controller 12 can easily accurately detect or estimate the maximum temperature of the fuel cell 20 regardless of the temperature distribution in the Y direction.

Figure 9:
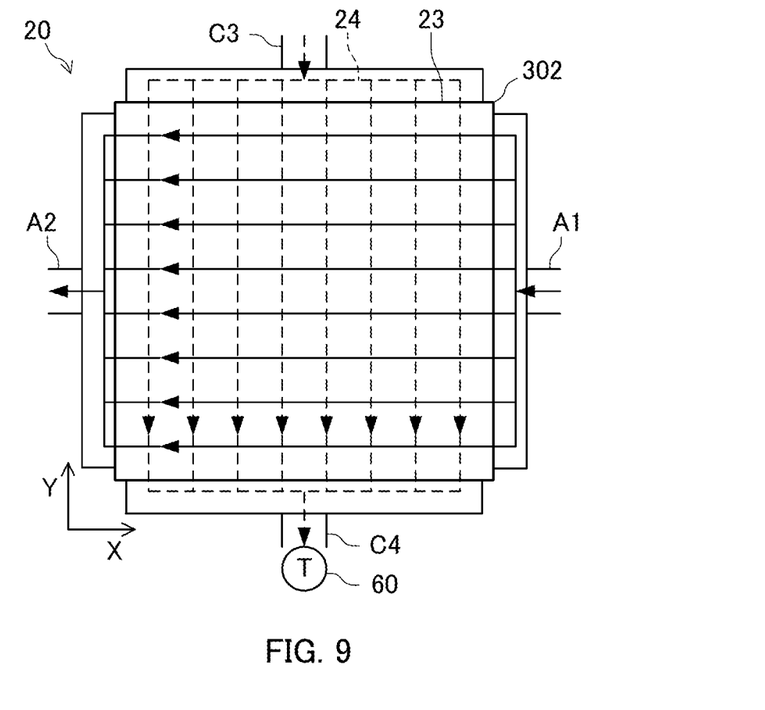
FIG. 9 is an explanatory diagram of a modification in which a flow path configuration of the fuel and the oxidant gas is changed.

In the first embodiment and the second embodiment described above, the fuel and the oxidant gas in the fuel cell 20 form the counter flow, but the fuel and the oxidant gas in the fuel cell 20 may form a so-called cross flow. For example, FIG. 9 is an explanatory diagram of a modification in which a flow path configuration of the fuel and the oxidant gas is changed. That is, instead of the counter-flow cell stack 21, the fuel cell 20 may adopt a cell stack 302 in which the second flow path 24 is a flow path for supplying the oxidant gas to the cell stack 21 such that the oxidant gas flows orthogonally to the fuel. In this way, also in a case where the cell stack 302 in which the fuel and the oxidant gas form the so-called cross flow is adopted, the control methods according to the first embodiment and the second embodiment described above can be performed, and effects thereof can be obtained. This is because, also in the cross-flow cell stack 302, the temperature of the discharged oxidant gas has a constant correlation with the maximum temperature in the temperature distribution in the fuel cell 20, and thus the controller 12 can estimate the maximum temperature of the fuel cell 20 based on the temperature of the discharged oxidant gas.

A parallel-flow cell stack may also be adopted in which the first flow path 23 and the second flow path 24 are made parallel to each other, and the fuel and the oxidant gas are made to flow through these flow paths in parallel to each other. Also in this case, the control methods according to the first embodiment and the second embodiment described above can be performed, and the effects thereof can be obtained. However, in order to make the temperature distribution in the fuel cell 20 uniform and increase the power generation efficiency regardless of whether partial oxidation reforming is occurred, it is preferable to adopt the counter-flow cell stack 21 or the cross-flow cell stack 302, and it is particularly preferable to adopt the counter-flow cell stack 21.

Figure 10:
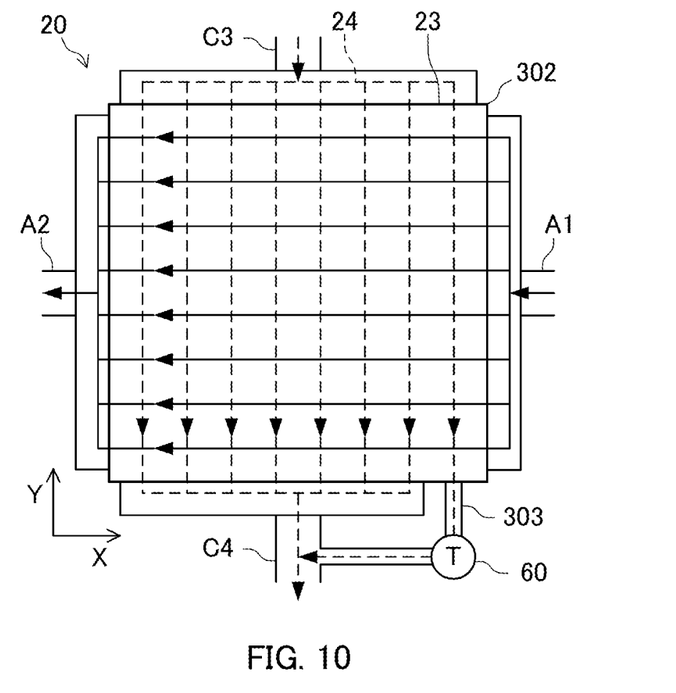
FIG. 10 is an explanatory diagram of a modification in which the flow path configuration of the fuel and the oxidant gas and the attachment position of the temperature sensor are changed.

FIG. 10 is an explanatory diagram of a modification in which the flow path configuration of the fuel and the oxidant gas and the attachment position of the temperature sensor 60 are changed with respect to the first embodiment and the second embodiment described above. In the modification of the fuel cell 20 in FIG. 10, the cross-flow cell stack 302 is adopted, and a flow path 303 is provided in which a part of the second flow path 24 is drawn out and merges into the cathode outlet C4. The temperature sensor 60 is provided in the flow path 303. As described above, in a case where the cross-flow cell stack 302 is adopted, when the flow path 303 is provided in which a part of the second flow path 24 is drawn out and the temperature sensor 60 is provided in the flow path 303, a correlation between the maximum temperature in the temperature distribution in the fuel cell 20 and the temperature Tq of the discharged oxidant gas to be detected is high. Therefore, when the controller 12 estimates the maximum temperature of the fuel cell 20, an accuracy is increased, and as a result, an accuracy of the temperature control of the fuel cell 20 is increased. Particularly, as shown in FIG. 10, when the flow path 303 is provided on the anode inlet A1 side where a relatively large amount of partial oxidation reforming is occurred, in a case where a portion having a maximum temperature is generated on the anode inlet A1 side in the fuel cell 20 due to the heat generated by partial oxidation reforming, a temperature of the portion can be detected directly and accurately. Therefore, the temperature control of the fuel cell 20 by the controller 12 can be performed more accurately.

Although the embodiments of the present invention have been described above, the above embodiments are merely a part of application examples of the present invention, and are not intended to limit the technical scope of the present invention to the specific configurations of the above embodiments. Various changes and modifications may be made to the above embodiments within the scope of the matters described in the claims. The technical ideas described in the embodiments and the modifications described above may be appropriately combined.

The invention claimed is:

1. A control method for a fuel cell system that comprises a fuel cell comprising a cell stack, the cell stack comprising a reforming catalyst for generating hydrogen from hydrocarbon, a first flow path configured to supply a fuel containing hydrocarbon to the cell stack, a second flow path configured to supply an oxidant gas to the cell stack such that the oxidant gas flows oppositely or orthogonally to the fuel, a fuel flow rate adjustment device configured to adjust a flow rate of the fuel to be supplied to the fuel cell, and an air flow rate adjustment device configured to adjust a flow rate of air to be mixed with the fuel, the control method comprising:
    detecting, in an oxidant gas discharge path, a temperature of a discharged oxidant gas, which is the oxidant gas discharged from the second flow path;
    performing a temperature control of the fuel cell based on the temperature of the discharged oxidant gas when partial oxidation reforming occurs in the cell stack by supplying air to the first flow path; and
    controlling the flow rate of the fuel and the flow rate of the air such that a heat generation by partial oxidation reforming in the cell stack becomes a predetermined target heat generation based on the temperature of the discharged oxidant gas, wherein the target heat generation is set such that the temperature of the discharged oxidant gas does not exceed a heatproof limit temperature of the reforming catalyst in the temperature control of the fuel cell.

2. The control method for a fuel cell system according to claim 1, wherein:
    the temperature control of the fuel cell is performed when the temperature of the discharged oxidant gas is equal to or higher than a temperature at which partial oxidation reforming is possible in the cell stack.

3. A fuel cell system, comprising:
    a first fuel cell comprising a cell stack comprising a reforming catalyst for generating hydrogen from hydrocarbon, a first flow path configured to supply a fuel containing hydrocarbon to the cell stack, and a second flow path configured to supply an oxidant gas to the cell stack such that the oxidant gas flows oppositely or orthogonally to the fuel;
    a temperature sensor located in an oxidant gas discharge path and configured to detect a temperature of a discharged oxidant gas, which is the oxidant gas discharged from the second flow path;
    a fuel flow rate adjustment device configured to adjust a flow rate of the fuel to be supplied to the first fuel cell; and
    an air flow rate adjustment device configured to adjust a flow rate of air to be mixed with the fuel; and
    a controller configured to:
        perform a temperature control of the first fuel cell based on the temperature of the discharged oxidant gas when partial oxidation reforming occurs in the cell stack by supplying air to the first flow path, and
        control the flow rate of the fuel and the flow rate of the air such that a heat generation by partial oxidation reforming in the cell stack becomes a predetermined target heat generation based on the temperature of the discharged oxidant gas, wherein the target heat generation is set such that the temperature of the discharged oxidant gas does not exceed a heatproof limit temperature of the reforming catalyst in the temperature control of the first fuel cell.

4. The fuel cell system according to claim 3, further comprising:
    a second fuel cell to which the fuel discharged from the first fuel cell is supplied.

5. The fuel cell system according to claim 4, wherein:
    the first fuel cell is configured to receive an oxidant gas discharged from the second fuel cell.

6. The fuel cell system according to claim 4, wherein:
    the second fuel cell has less reforming catalyst than the first fuel cell.

* * * * *